United States Patent [19]

Sathi et al.

[11] Patent Number: 5,257,377
[45] Date of Patent: Oct. 26, 1993

[54] PROCESS FOR AUTOMATICALLY MIGRATING A SUBSET OF UPDATED FILES FROM THE BOOT DISK TO THE REPLICATED DISKS

[75] Inventors: Kitty Sathi, Pittsford; Ronald A. Ippolito, Rochester; Colleen R. Enzien, Penfield; Christopher Comparetta, Pittsford; Lyssa E. Menard, Rochester, all of N.Y.

[73] Assignee: Xerox Corporation, Stamford, Conn.

[21] Appl. No.: 678,924

[22] Filed: Apr. 1, 1991

[51] Int. Cl.$^5$ ............................................. G06F 15/00
[52] U.S. Cl. ..................................... 395/700; 395/600;
    395/575; 364/245.5; 364/246.6; 364/DIG. 1
[58] Field of Search ............... 395/500, 700, 600, 575;
    371/11; 364/900, 200

[56] References Cited

U.S. PATENT DOCUMENTS

| | | | |
|---|---|---|---|
| 4,558,413 | 12/1985 | Schmidt et al. | 364/200 |
| 4,608,688 | 8/1986 | Hansen et al. | 371/11 |
| 4,755,936 | 7/1988 | Stewart et al. | 364/200 |
| 4,866,604 | 9/1989 | Reid | 364/200 |
| 4,937,864 | 6/1990 | Caseiras et al. | 380/4 |
| 5,008,814 | 3/1991 | Mathur | 364/200 |
| 5,027,316 | 6/1991 | Frantz et al. | 364/900 |
| 5,155,837 | 10/1992 | Liu et al. | 395/500 |
| 5,163,148 | 11/1992 | Walls | 395/600 |
| 5,210,854 | 5/1993 | Beaverton et al. | 395/500 |

OTHER PUBLICATIONS

Lunbeck, R. J. "File Updating Revisited," in Software, Practice and Experience, Mar. 1986.

Primary Examiner—Thomas C. Lee
Assistant Examiner—Michael A. Oblon
Attorney, Agent, or Firm—Frederick E. McMullen

[57] ABSTRACT

An electronic printing system with plural hard disks for storing system files in which upgraded software together with software identification data is written to a first of the disks, the system booted from the first disk, and the upgraded software thereafter migrated from the first disks to the other disks.

3 Claims, 18 Drawing Sheets

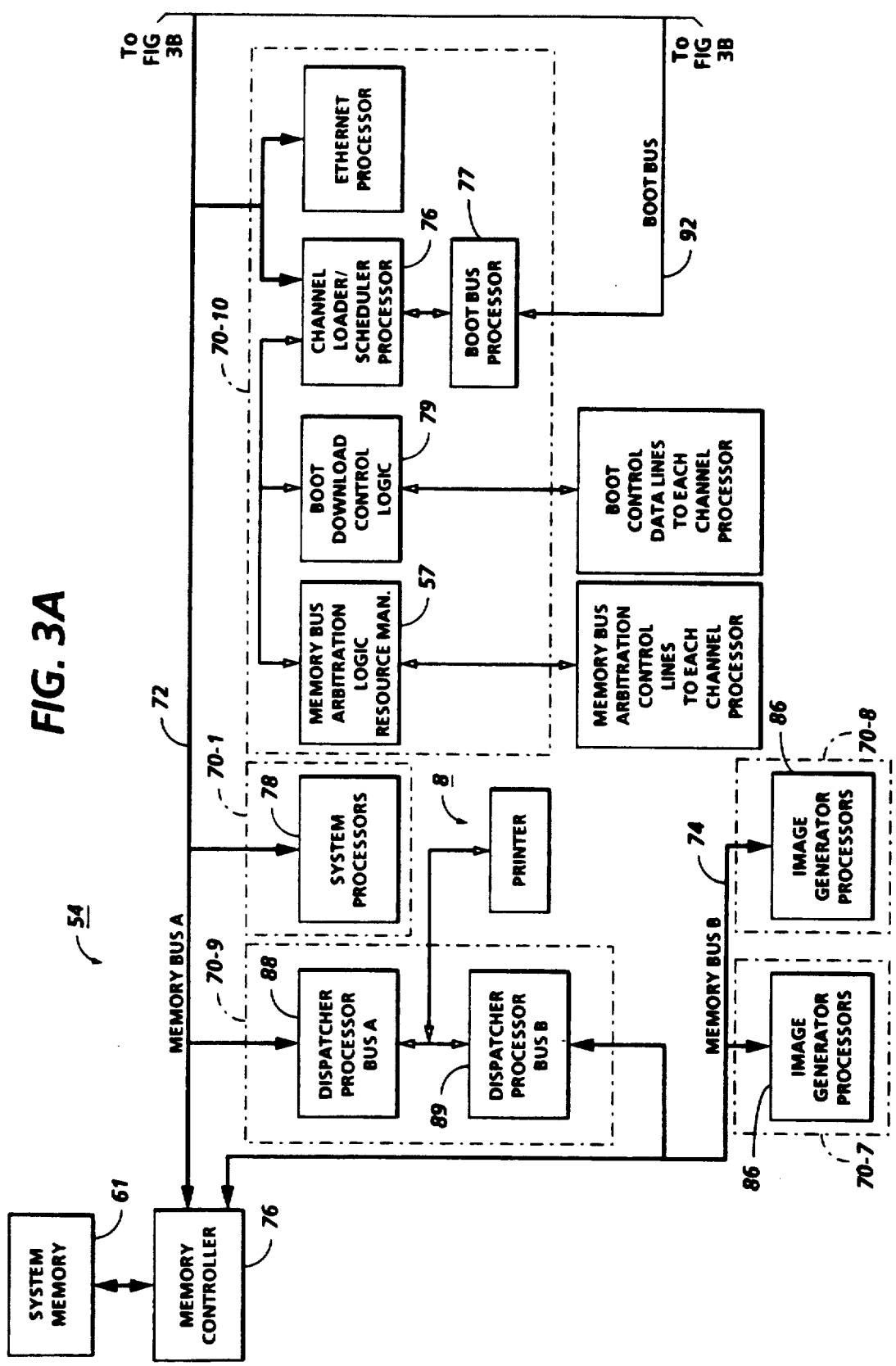

PROCESS FOR AUTOMATICALLY MIGRATING A SUBSET OF UPDATED FILES FROM THE BOOT DISK TO THE REPLICATED DISKS

The present application is related to the following co-pending applications, which are assigned to the same assignee as is the present application and incorporated by reference herein: U.S. patent application Ser. No. 07/678,922, filed Apr. 1, 1991, to Mark A. Smith, et al. to "Process For Replacing Non-Volatile Memory In Electronic Printing Systems"; pending U.S. patent application Ser. No. 07/678,923, filed Apr. 1, 1991, to Kitty Sathi, et al. to "File Compaction Process For Electronic Printing Systems"; now U.S. Pat. No. 5,212,786; U.S. patent application Ser. No. 07/678,925, filed Apr. 1, 1991, to Christopher Comparetta, et al. to "A Process For Replacing Storage Media In Electronic Printing Systems"; pending U.S. patent application Ser. No. 07/678,926, filed Apr. 1, 1991, to Kitty Sathi, et al. to "File Storage Process For Electronic Printing Systems Having Multiple Disks"; pending U.S. patent application Ser. No. 07/678,508, filed Apr. 1, 1991, to Robert J. Slomcenski, et al. to "File Updating Process For Electronic Printing Systems"; pending and U.S. patent application Ser. No. 07/678,091, filed Apr. 1, 1991, to Ronald A. Ippolito, et al. to "Process For Accommodating Bad Disk Pages In An Electronic Printing System" pending.

BACKGROUND OF THE INVENTION

The invention relates to electronic printers and printing systems, and more particularly, to a file upgrading process for such systems.

An important task of the operating system in an electronic printing system is the maintenance of files which are permanent objects recorded on backing storage such as hard disks. A file consists of a sequence of pages, the contents of which must be preserved across system restarts. The file system provides the operating system with facilities for creating, organizing, reading, writing, modifying, copying, moving, deleting, and controlling access to the files. However, a system has to be upgraded when new software is released, a process that replaces files critical to system operation. After the installation is completed, the customer or user expects that the machine will boot and they can start using it. If there is a problem during the upgrade process, then the system needs to be restored back to its original level without destroying all of the customer files. Accordingly, the upgrade process needs to guarantee that the system can be booted afterwards and is usable even though the attempt to upgrade the system with new software was not successful.

While it is known in the prior art to store the operating software for reproduction machine on a hard disk, as shown in U.S. Pat. No. 4,937,864 to Caseiras et al, there is no disclosure to a process for upgrading current system software with a new software release in a printing system.

SUMMARY OF THE INVENTION

In accordance with the present invention there is provided a process for a printing machine having plural disks providing permanent memory for storing system software. A first one of the disks serves as a boot disk on starting of the system. The process includes the steps of: dedicating an area on each of the disks for storing the software revision level of the software on the disks; inputting the new software release to the system; updating the software files on the boot disk from the new software; marking software files on the boot disk that are updated inconsistent; updating the software revision level on the boot disk to identify that the software on the boot book disk has been upgraded; terminating the software upgrading process when updating of the boot disk is completed; booting the system from the boot disk; on booting the system to an operating state, migrating the inconsistent software files from the boot disk to the remaining ones of the disks to upgrade the software on the remaining disks; and updating the software revision level on the remaining disks to identify that the software on the remaining disks has been upgraded.

BRIEF DESCRIPTION OF THE DRAWINGS

FIGS. 3A, 3B, and 3C comprise a schematic block diagram showing the major parts of the control section for the printing system shown in FIG. 1;

DESCRIPTION OF THE PREFERRED EMBODIMENT

Figure 1:
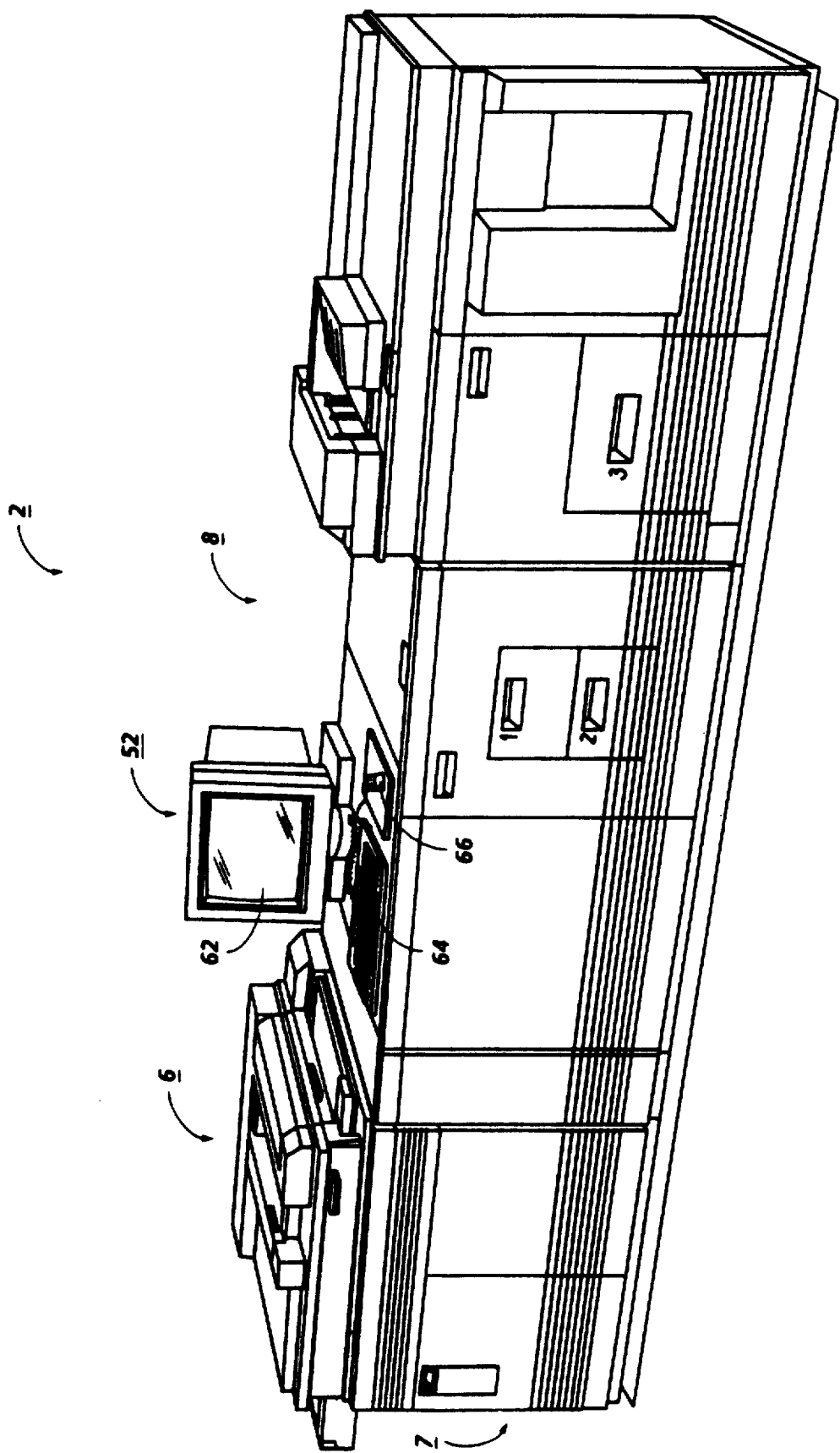
FIG. 1 is a view depicting an electronic printing system incorporating the file upgrading process of the present invention.
Figure 2:
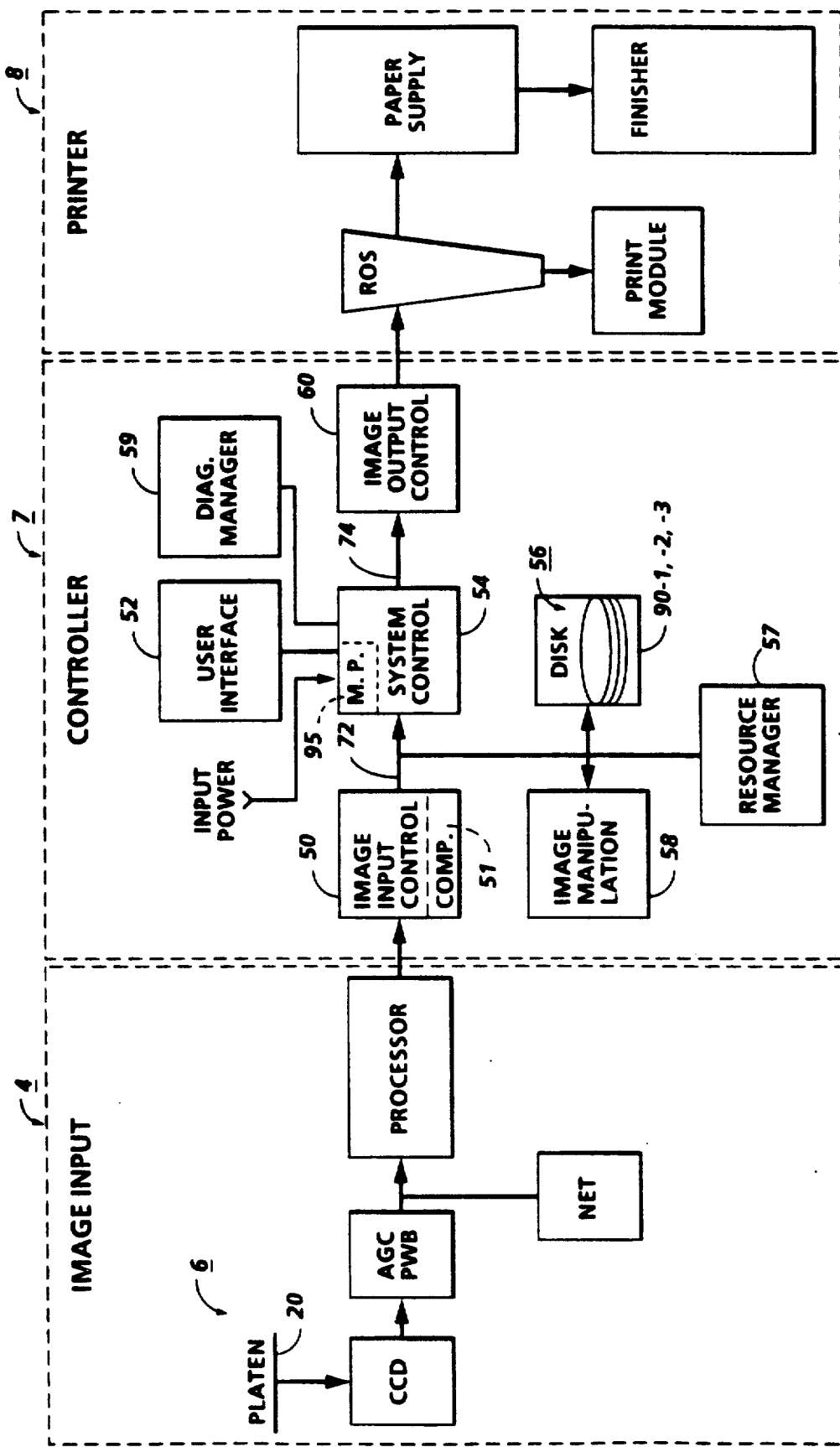
FIG. 2 is a block diagram depicting the major control system elements of the printing system shown in FIG. 1.

Referring to drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and furthermore may be incorporated in electronic display systems, such as CRTs, LCDs, LEDs, etc. or else other image scanning/processing/recording systems, or else other signal transmitting/receiving, recording systems, etc. as well.

A more detailed description of printing system 2 may be found in copending U.S. patent application Ser. No. 07/620,519, U.S. Pat. No. 5,057,869, filed Nov. 30, 1990, to James R. Graves et al, and entitled "System for Scanning Signature Pages", the disclosure of which is incorporated by reference herein.

Referring to FIG. 2, controller section 7 is, for explanation purposes, divided into an image input controller 50, User Interface (UI) 52, system controller 54, disk memory 56, image manipulation section 58, Resource Manager 57, Diagnostic Manager 59, and image output controller 60.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, visual document facsimile display, programming information and icons, diagnostic information and pictorial views, etc. Items displayed on touchscreen 62 such as files and icons are actuated by either touching the displayed item on screen 62 with a finger or by using mouse 66 to point cursor 67 to the item selected and keying the mouse.

Referring to FIGS. 2 and 3A-3C, the scanned image data input from scanner section 6 to controller section 7 is compressed by image compressor/processor 51 of image input controller 50 on PWB 70-3. The compressed image data with related image descriptors are placed in image files and temporarily stored in system memory 61 pending transfer to main memory 56 where the data is held pending use.

When the compressed image data in memory 56 requires further processing, or is required for display on touchscreen 62 of UI 52, or is required by printer section 8, the data is accessed in memory 56 and transferred to system memory 61. Where further processing other than that provided by processor 25 is required, the data is transferred to image manipulation section 58 on PWB 70-6 where additional processing steps such as collation, make ready (document editing), decomposition, rotation, etc. are carried out. Following processing, the data may be returned to main memory 56, sent to UI 52 for display on touchscreen 62, or sent to image output controller 60.

Resource Manager 57 controls access to disks and RAM 61 of files while diagnostic manager 59 handles system faults.

Image data output to image output controller 60 is decompressed and readied for printing and output to printer section 8. Image data sent to printer section 8 for printing is normally purged from memory 56 to make room for new image data.

Figure 3B:
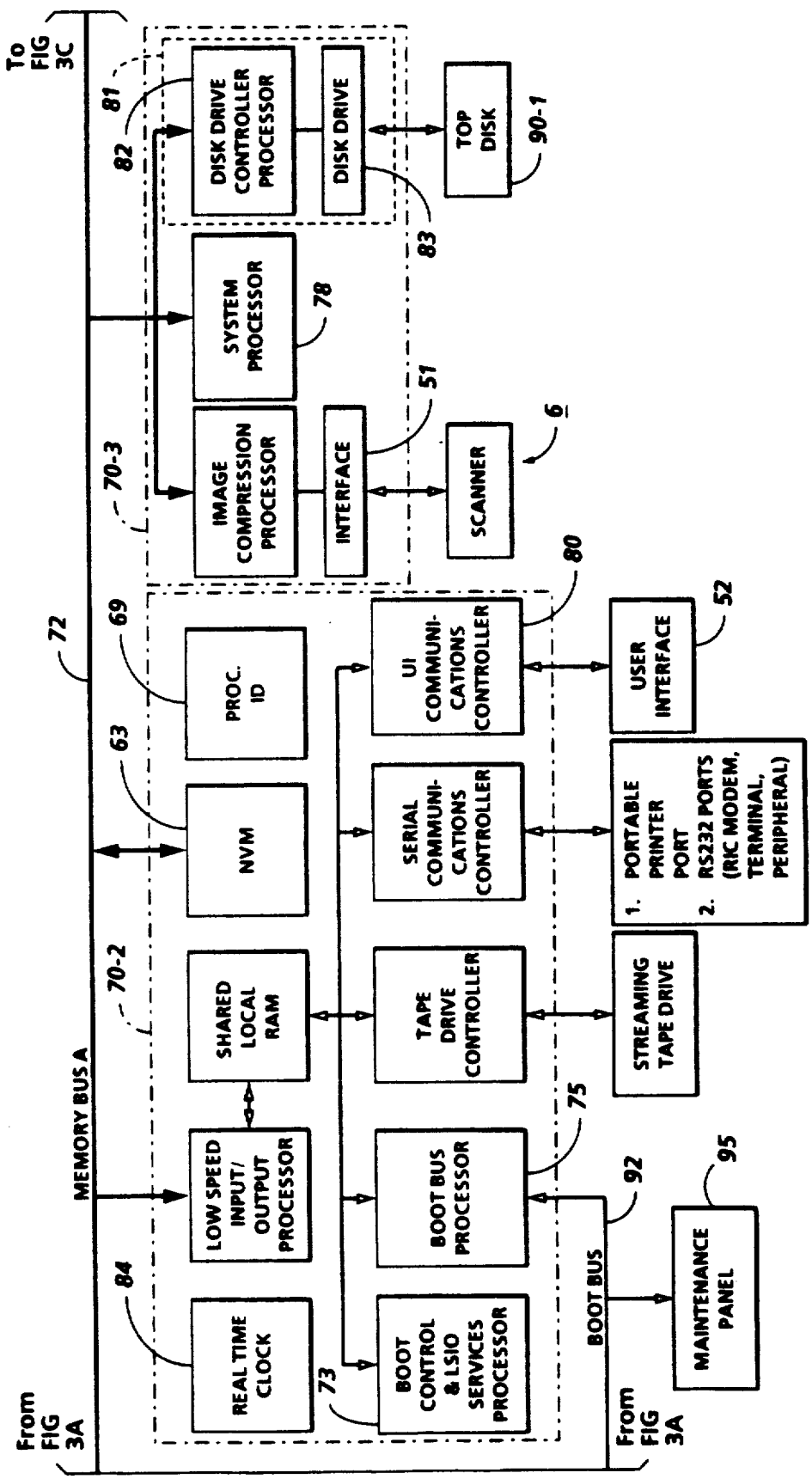
Figure 3C:
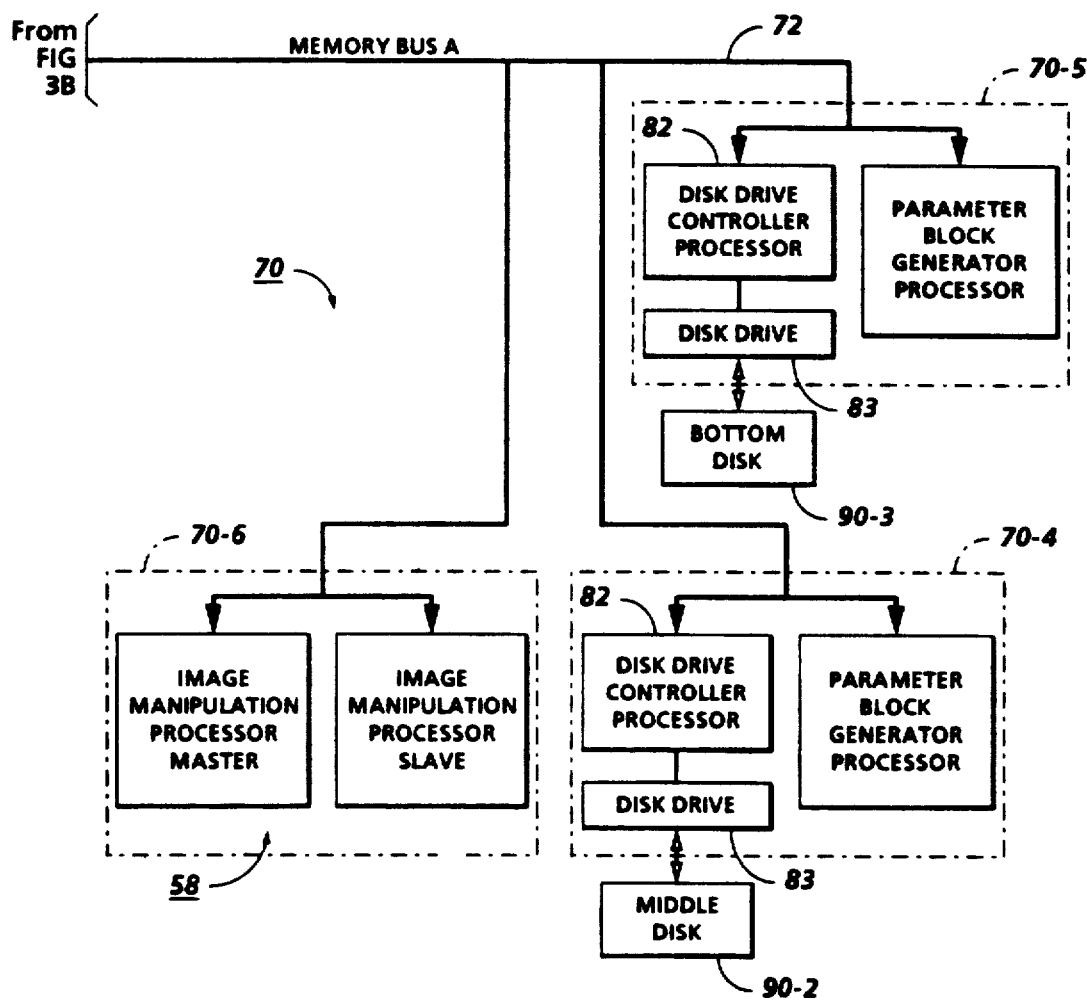

As shown in FIGS. 3A-3C, controller section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural application or system processors 78; low speed I/O processor PWB 70-2 having UI communication controller 80 for transmitting data to and from UI 52, Boot Control & LSIO Services Processor 73, and Boot Bus Processor 75; PWBs 70-3, 70-4, 70-5 having disk drive controller/processors 82 with disk drives 83 for transmitting data to and from disks 90-1, 90-2, 90-3 respectively of main memory 56 (image compressor/processor 51 for compressing the image data and another application processor 78 are on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10 having Channel Loader/Scheduler Processor 76, Boot Bus Processor 77, Boot Download Control Logic 79, and Memory Bus Arbitration Logic/Resource Manager 57. As will appear, Loader/Scheduler Processor 76 has two functions, one as a Boot channel to bring the system to the ready state and the other as a scheduler channel used to decide which channel performs which task and in which sequence the tasks will be performed.

Each independent processor and associated circuitry form a channel 81. Channels 81 (an example is shown in FIG. 3B) are independent processors for handling the applications software, or input/output processors for handling peripheral devices such as disk drives. For example, there are disk channels used to interface disk drives 83 for disks 90-1, 90-2, 90-3, scanner interface channel, printer interface channel, etc.

Main memory 56 has plural hard disks 90-1, 90-2, 90-3 on which system files and image files are stored. System files comprise system operating files such as boot files, software files, data files, etc., while image files are typically files of scanned image data.

System memory 61, which comprises a Random Access Memory or RAM, serves as a temporary store for data required during system operations. Memory 61 stores bits of data which can be written to (Data Entered) or read from (Data Used) from the memory. When data is read, a copy of the data is used in order to preserve data integrity. Other data in memory 61 is used for reference and remains loaded as long as power is supplied. Since memory 61 is volatile, that is, all data is lost when power to memory 61 is terminated, Non Volatile Memory or NVM 63, which essentially comprise RAM memory with battery backup to supply DC voltage when power is turned off, are provided at several locations in the system as, for example, on Low Speed I/O Processor PWB 70-2 (FIG. 3B). NVM 63 is used to store file management updates and file content updates.

Figure 4:
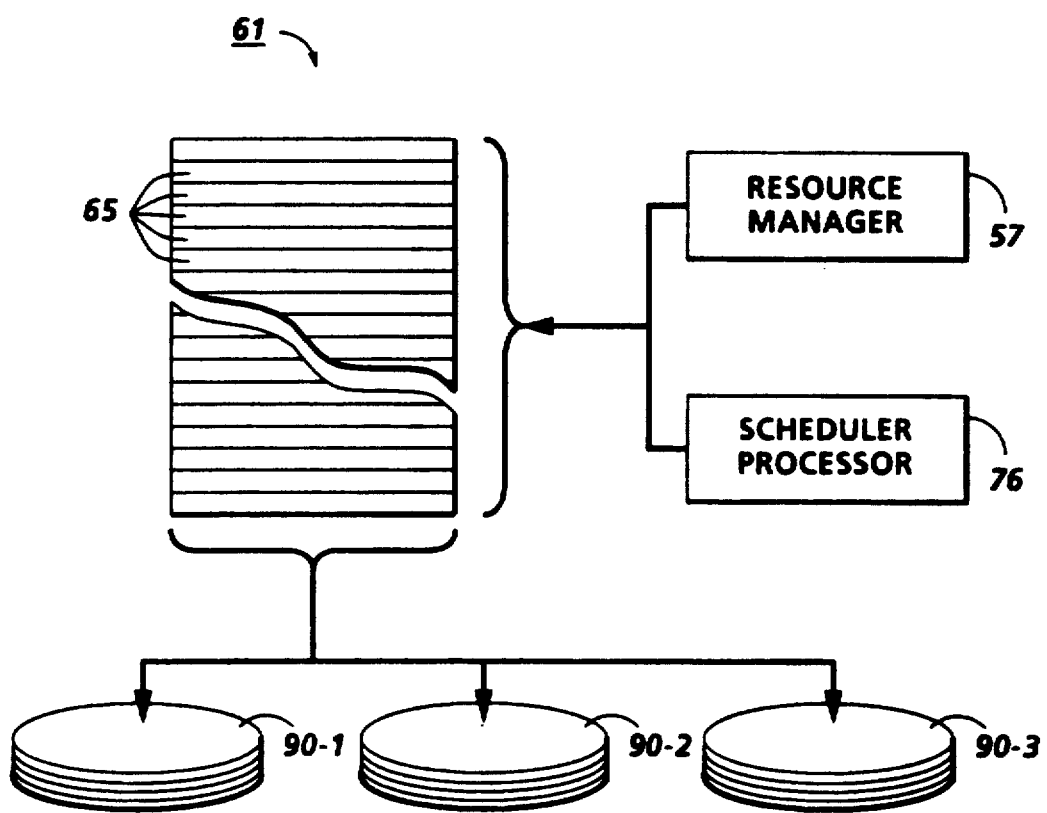
FIG. 4 is a block diagram depicting the process for transferring data from temporary RAM memory to hard disks.

Referring now to FIG. 4, Resource Manager 57 schedules access to disks 90-1, 90-2, 90-3 for clients. Data to be transferred to disks 90-1, 90-2, 90-3 is held in system memory 61 which is managed by Resource Manager 57. For this, buffers 65 assigned to the clients are handed to Resource Manager 57 and then written to the disk 90-1, 90-2, 90-3 whenever disk bandwidth is available.

As described in copending U.S. patent application Ser. No. 07/590,634, filed Sep. 28, 1990 now abandoned and refiled as a continuation application on Oct. 15, 1992, with Ser. No. 07/962,166, pending to George L. Eldridge, and entitled "Method of Operating Disk Drives in Parallel", the disclosure of which is incorporated by reference herein, image files are divided equally into three parts, with successive parts of the files spread equally across disks 90-1, 90-2, 90-3. This process (called Super Disk herein), allows faster read/write transfer since all three disks can be accessed simultaneously. The risk incurred in this type of arrangement however is the loss of parts of a file. This effectively results in loss of the entire file should one or more of the disks fail.

System files are normally permanent files which must be maintained. To assure retention, system files are replicated on each of the disks 90-1, 90-2, 90-3 at the same address. Replicated files are written simultaneously to all three disks 90-1, 90-2, 90-3, with the disk heads in the same position.

As a result, both super disk files (i.e., image files that are distributed equally on each disk 90-1, 90-2, 90-3 of the system) and replicated files (i.e., duplicate system files on each disk 90-1, 90-2, 90-3) are created. When super disk files are accessed, all disks 90-1, 90-2, 90-3 are busy retrieving/storing data from/to disks. When a copy of a replicated file is accessed for reading, only one disk is busy. Since reading a file from a single disk takes longer than accessing a super disk file, Channel Loader/Scheduler Processor 76 schedules single disk access to all disks 90-1, 90-2, 90-3 in parallel, allowing the system to retrieve more than one file at a time.

Figure 5:
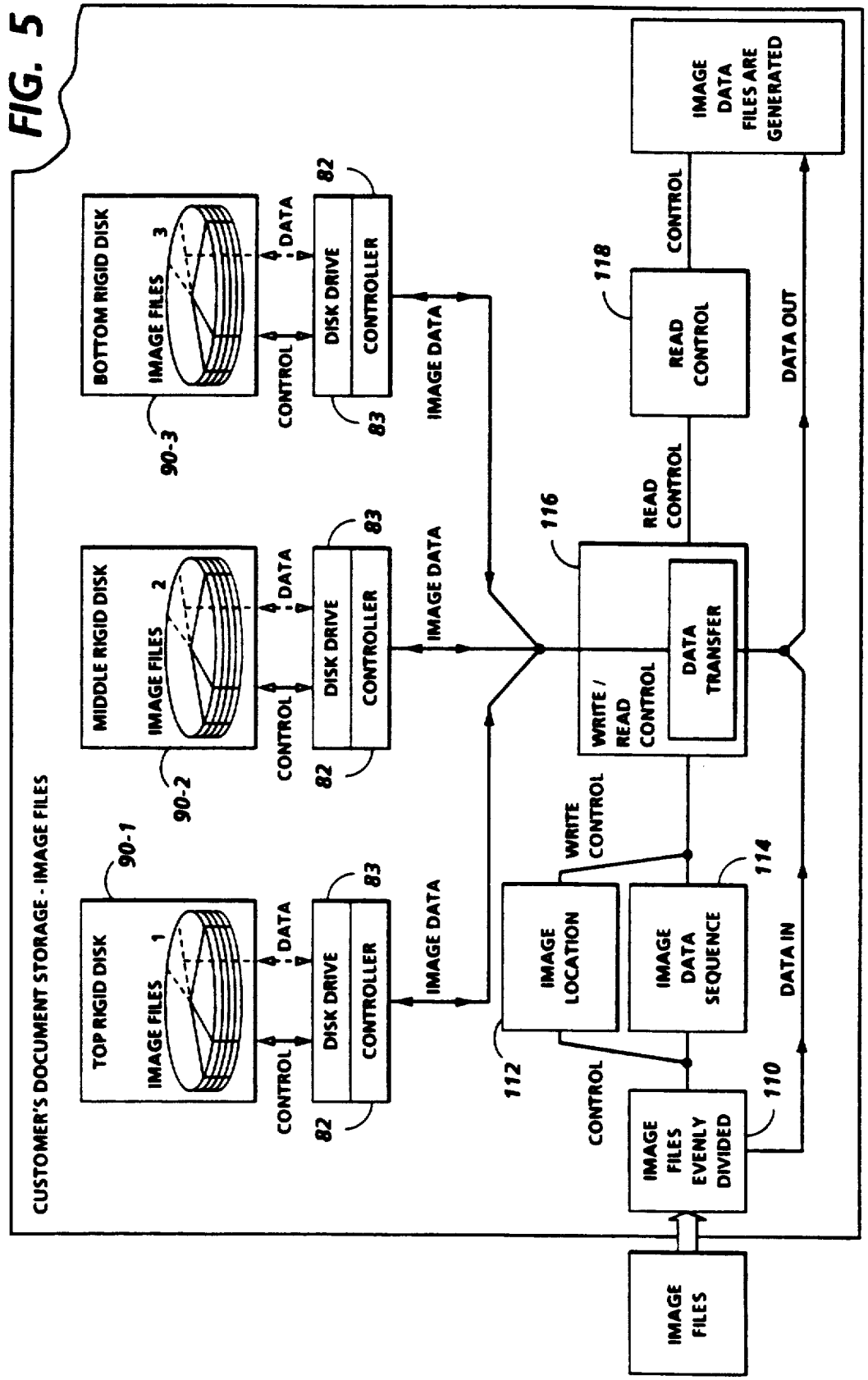
FIG. 5 is a block diagram depicting the process for storing image files on disks to provide super disk files.

Referring to FIG. 5, image files to be transferred to disks 90-1, 90-2, 90-3 are evenly divided among the three disks by divider logic 110, with transfer to disks 90-1, 90-2, 90-3 controlled by image location logic 112, image data sequence logic 114, and write/read control logic 116 of disk drive controller processor 82. Divider logic 110 divides the image files evenly between the disk drives 83 for disks 90-1, 90-2, 90-3 to form one larger storage media or super disk. Image location logic 112 designates the location sectors for each image file on disk drives 90-1, 90-2, 90-3. Image data sequence logic 114 controls the disk writing sequence. In the arrangement shown, the first image file segment is written to disk 90-1, the second image file segment to disk 90-2, the third image file segment to disk 90-3, the fourth image file segment to disk 90-1, and so forth until all the image file data has been written. Write/read control logic 116 provides the actual instructions to write or read image data to or from disks 90-1, 90-2, 90-3. Image data read from disks 90-1, 90-2, 90-3 is reconstructed by read control logic 118 which reads the image file segments back from disks 90-1, 90-2, 90-3 in the same manner as the data was written to disks 90-1, 90-2, 90-3.

Figure 6:
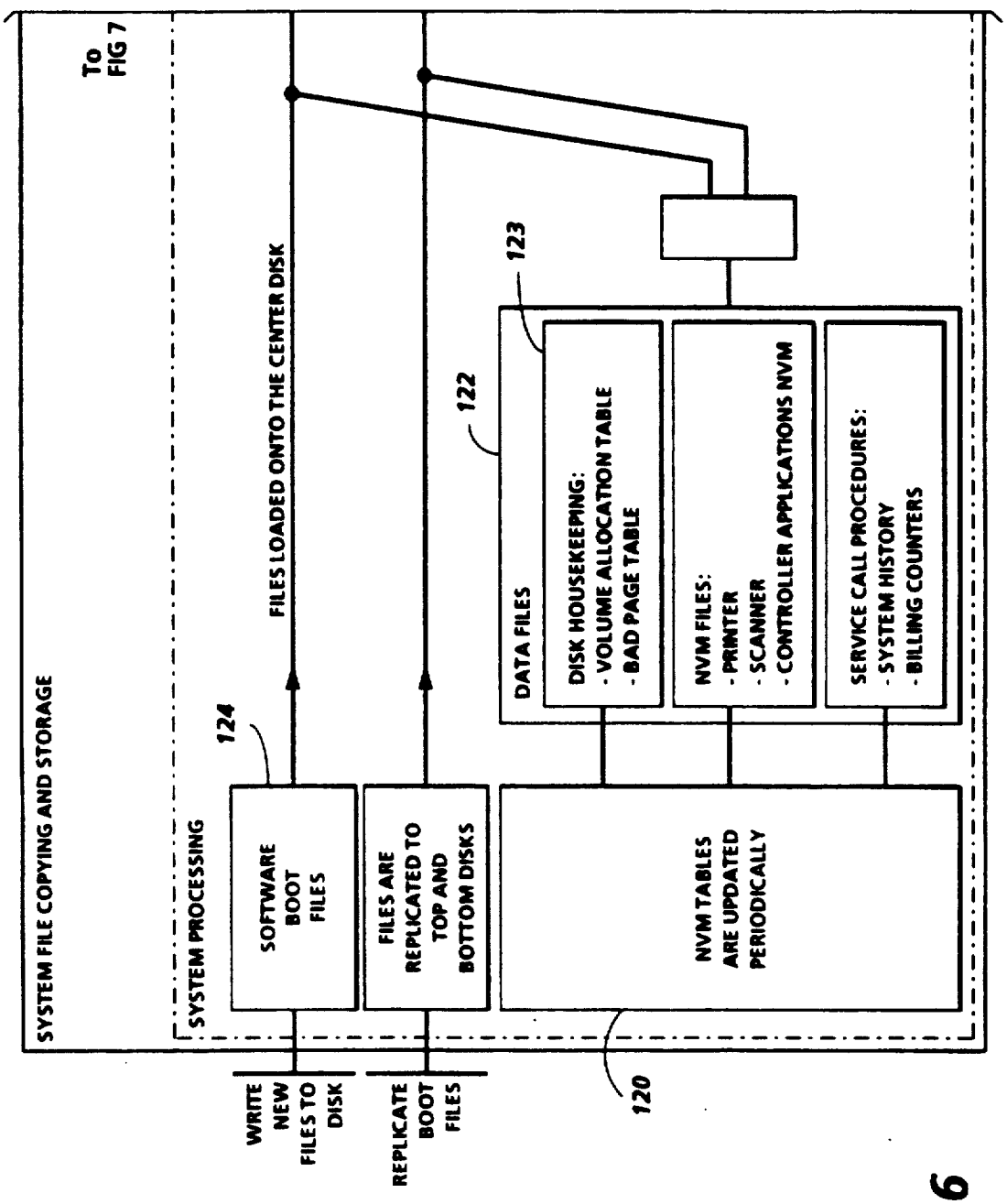
FIG. 6 is a block diagram depicting the process for collecting system files for storage on disks.
Figure 7:
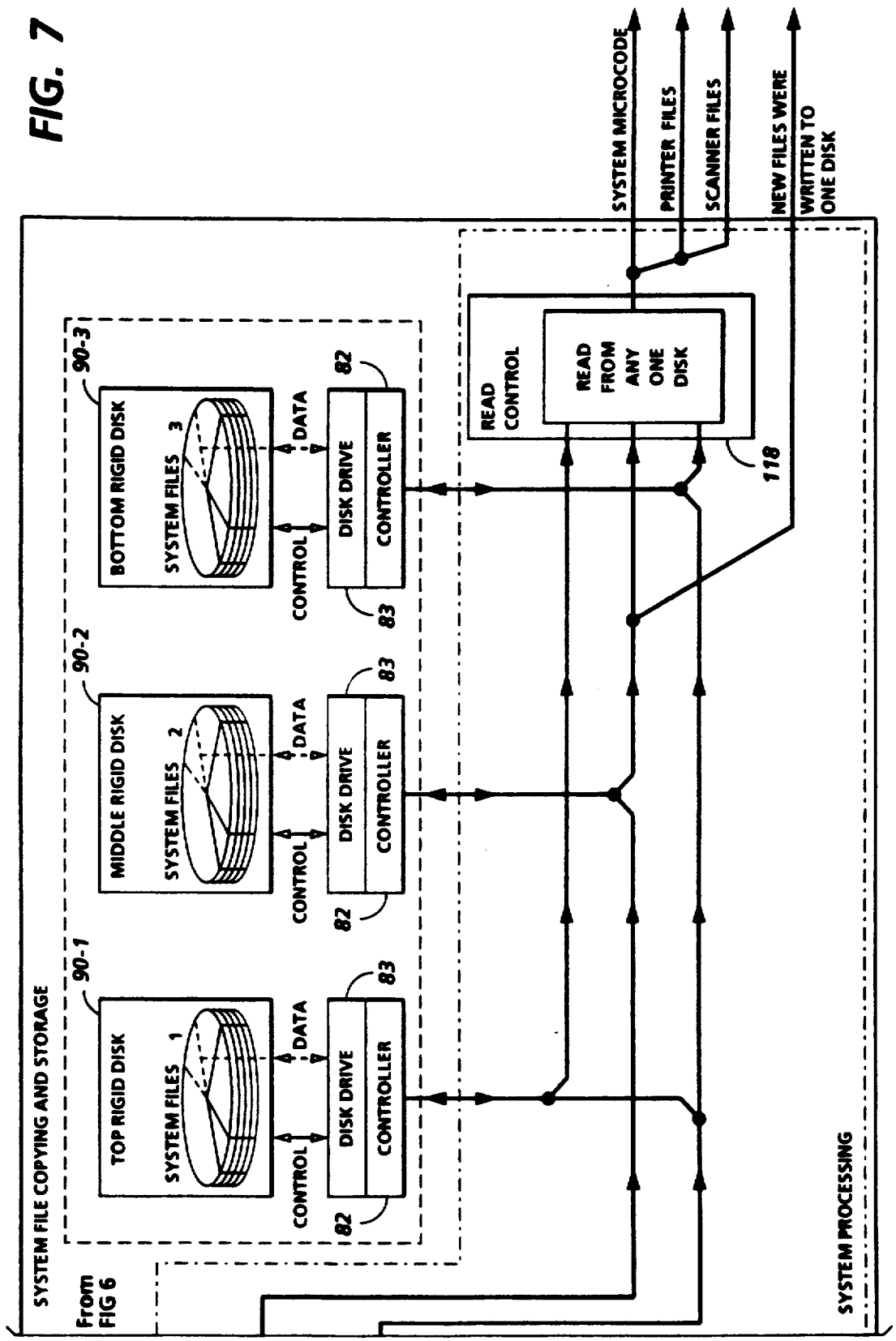
FIG. 7 is a block diagram depicting the process for replicating system files collected from FIG. 6 on disks.

Referring to FIGS. 6 and 7, system files, whether updates 120 of data files 122 that occurs periodically during operation and life of the system 2, or new files such as new or upgraded software entered as software boot files 124, are loaded onto center disk 90-2 through Disk Drive Control Processor 82 for disk 90-2. The system files are replicated on top and bottom disks 90-1, 90-3 as will appear. Read control 118 reads system files from any one of the disks 90-1, 90-2, 90-3.

Figure 16:
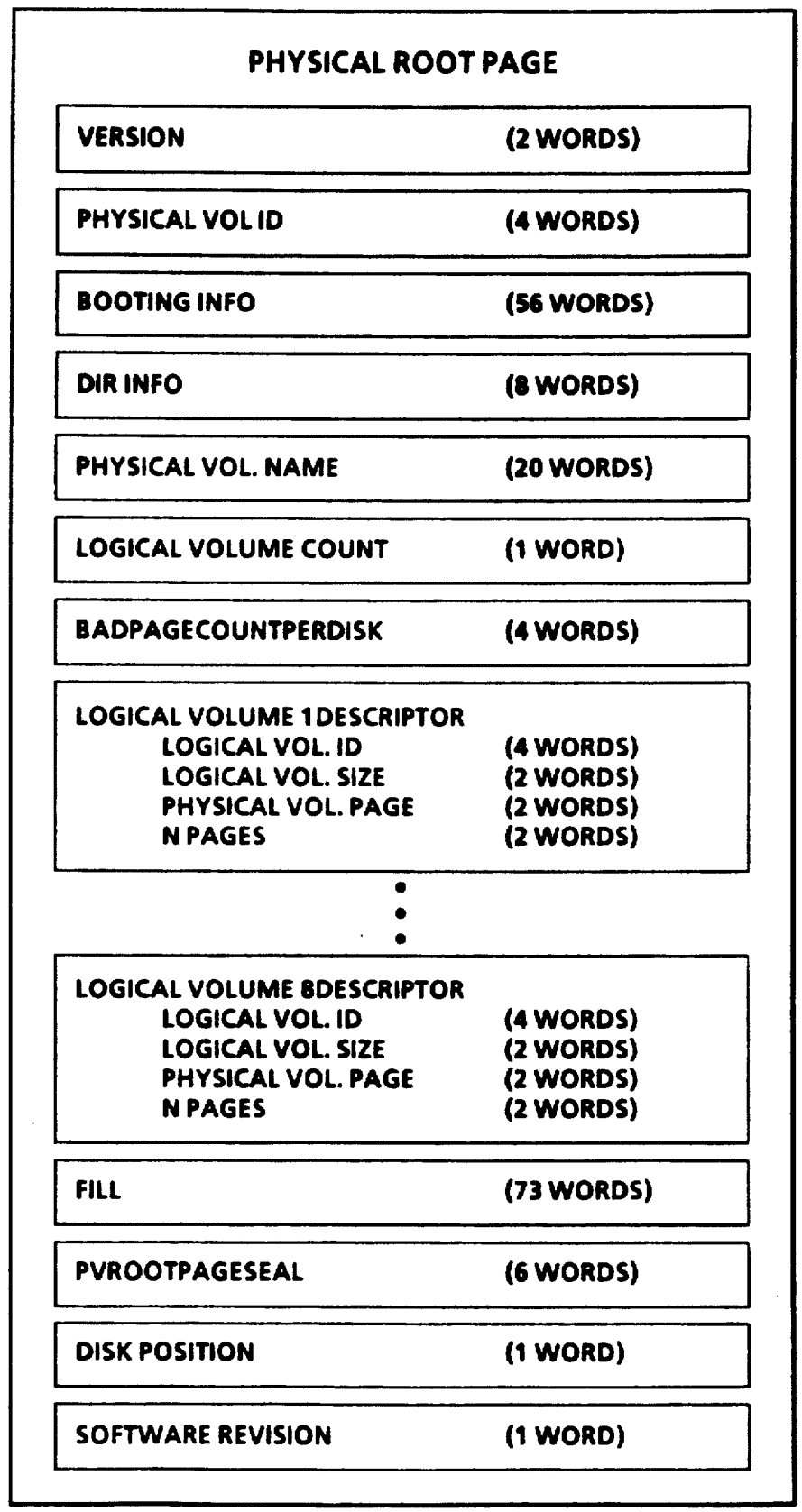
FIG. 16 is a view depicting the "Physical Root Page" stored in disk memory.

Processor identification seals, which comprise, for example, a 12 byte quantity having a 6 byte time stamp read from the system real time clock 84 (seen in FIG. 3B) and a 6 byte processor identification (PROC ID), are provided. The PROC ID is kept on a chip 69 socketed onto PWB 70-2 (seen in FIG. 3B) and remains with the machine in the event PWB 70-2 is replaced. A copy of the processor ID and initialized time stamp is stored in system NVM 63 on PWB 70-2 (seen in FIG. 3B). On each disk 90-1, 90-2, 90-3, the disk Physical Volume Root Page (PV Root page—see FIG. 16), which includes a PV Root Page seal comprising the PROC ID seal plus the position of the disk in the super disk setup, is stored at page zero.

With the identification seals described above, replacement of one of the disks 90-1, 90-2, 90-3 or PWB 70-2 can be determined. Further, the identification seals enable switching or swapping of the disks with one another to be detected.

Figure 8:
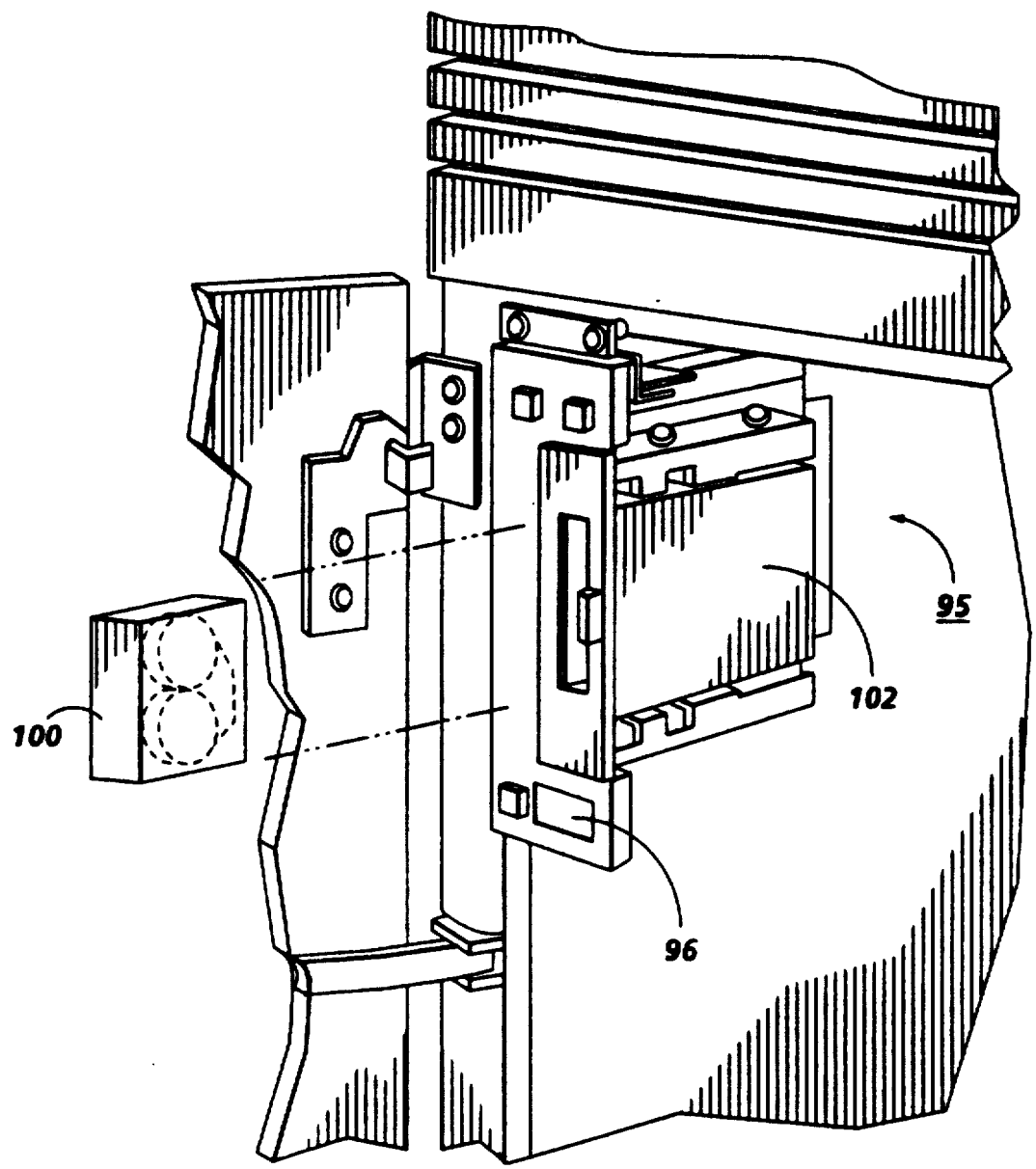
FIG. 8 is an isometric view showing details to the maintenance panel used to load new and upgraded software into the printing system.

Referring to FIG. 8, system controller 54 includes a maintenance panel 95 which serves to monitor input power to the system and to enable machine servicing personnel, herein referred to as Tech Reps, to service the machine, load new or upgraded software, etc. Panel 95, which is located at any suitable point on the machine, contains various power switches, test buttons, etc., together with an LED display 96, having a plurality of LEDs. Actuation of various LEDs and LED combinations is used to identify certain system operating conditions, faults, etc.

Referring to FIGS. 3A, 3B, and 9–14 and Table I, a boot file is replicated on each of the disks 90-1, 90-2, 90-3 for booting system 2. In order to disk boot system 2, the boot software loads the necessary files from the boot disk into memory and enables execution of the software. Since the boot file is replicated on all disks 90-1, 90-2, 90-3, the system can boot from any disk and inform the operator when one disk is not available. In the subsequent explanation, the boot disk is presumed to be disk 90-2, although as indicated either disk 90-1 or 90-3 may be used instead.

Figure 9:
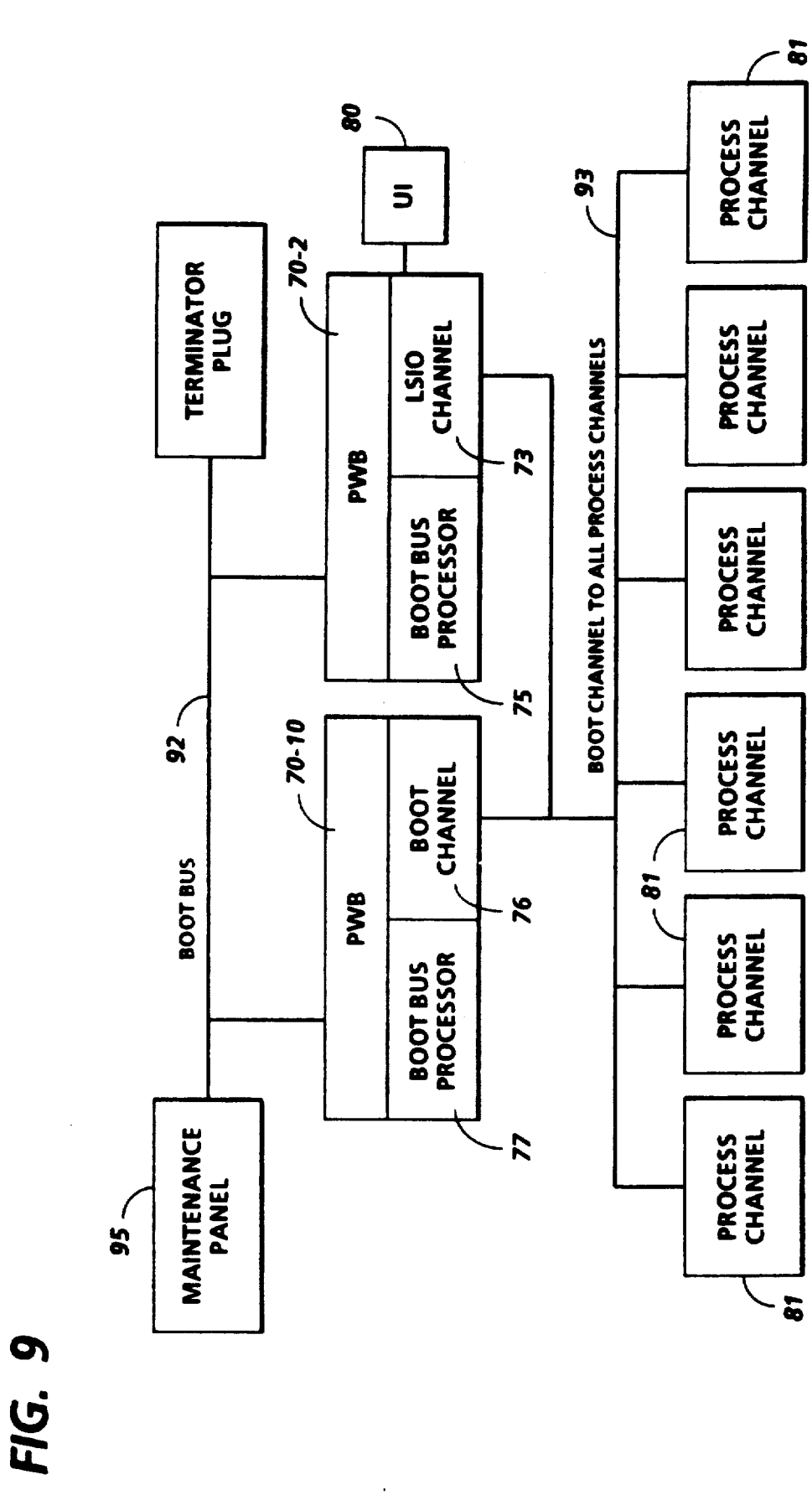
FIG. 9 is a block diagram showing the boot system for booting the printing system depicted in FIG. 1 to an operating state.
Figure 10:
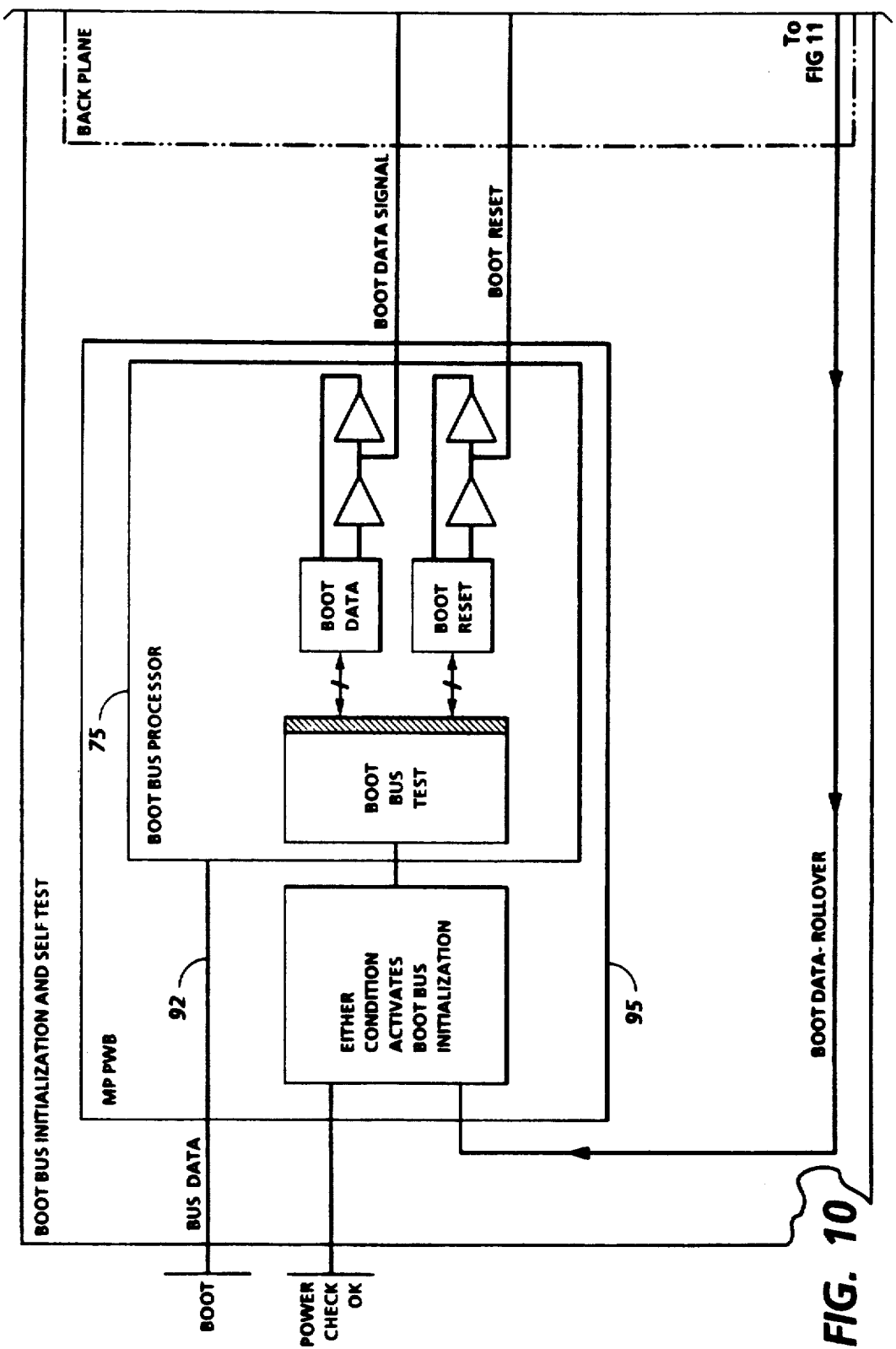
FIG. 10 is a block diagram showing the boot initializing and self-testing carried out during booting.
Figure 11:
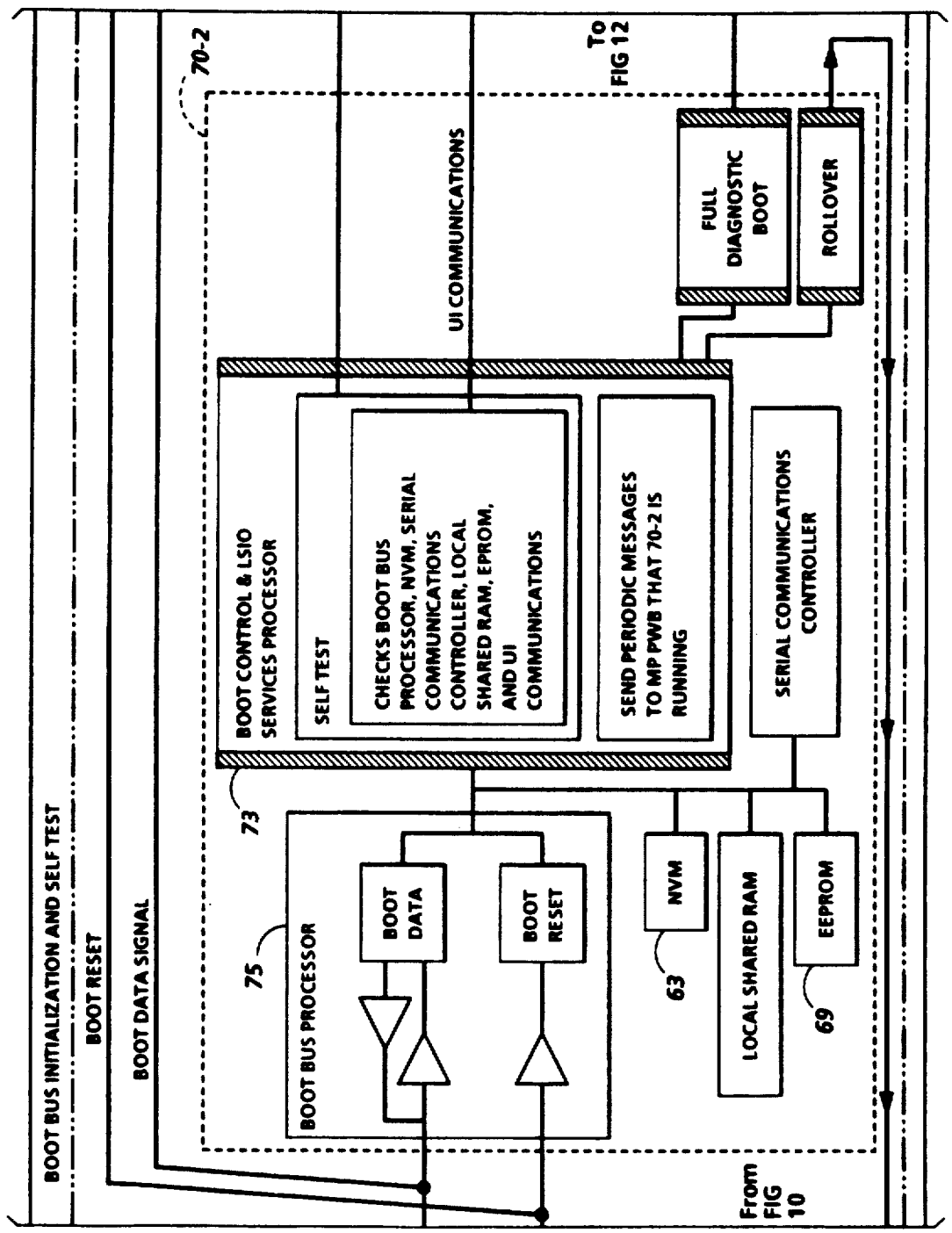
FIG. 11 is a block diagram showing the process for initializing the system boot control and LSIO services processor during booting.
Figure 12:
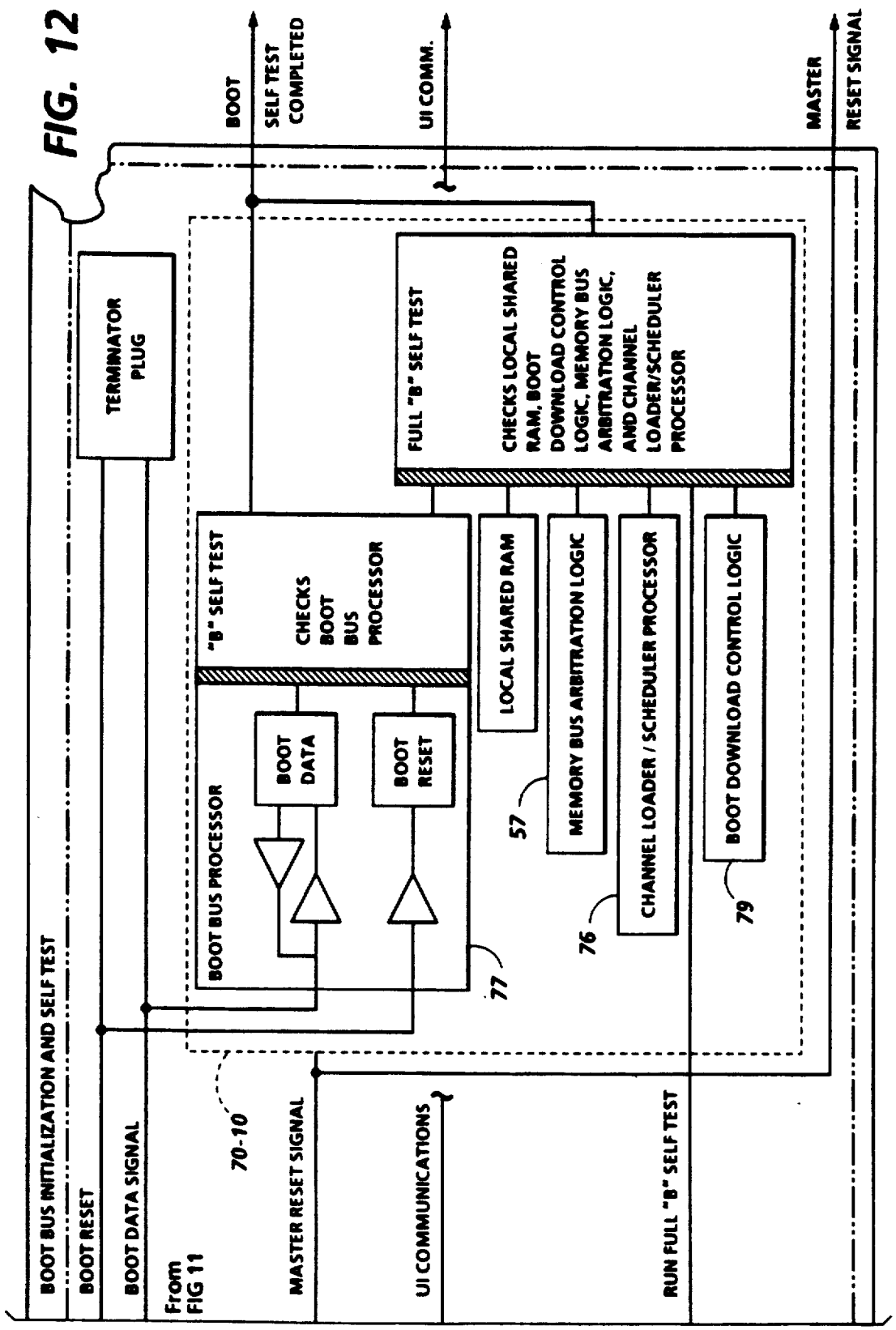
FIG. 12 is a block diagram showing the process for initializing the system channel loader/scheduler processor, boot download control logic, and memory bus arbitration logic during booting.
Figure 13:
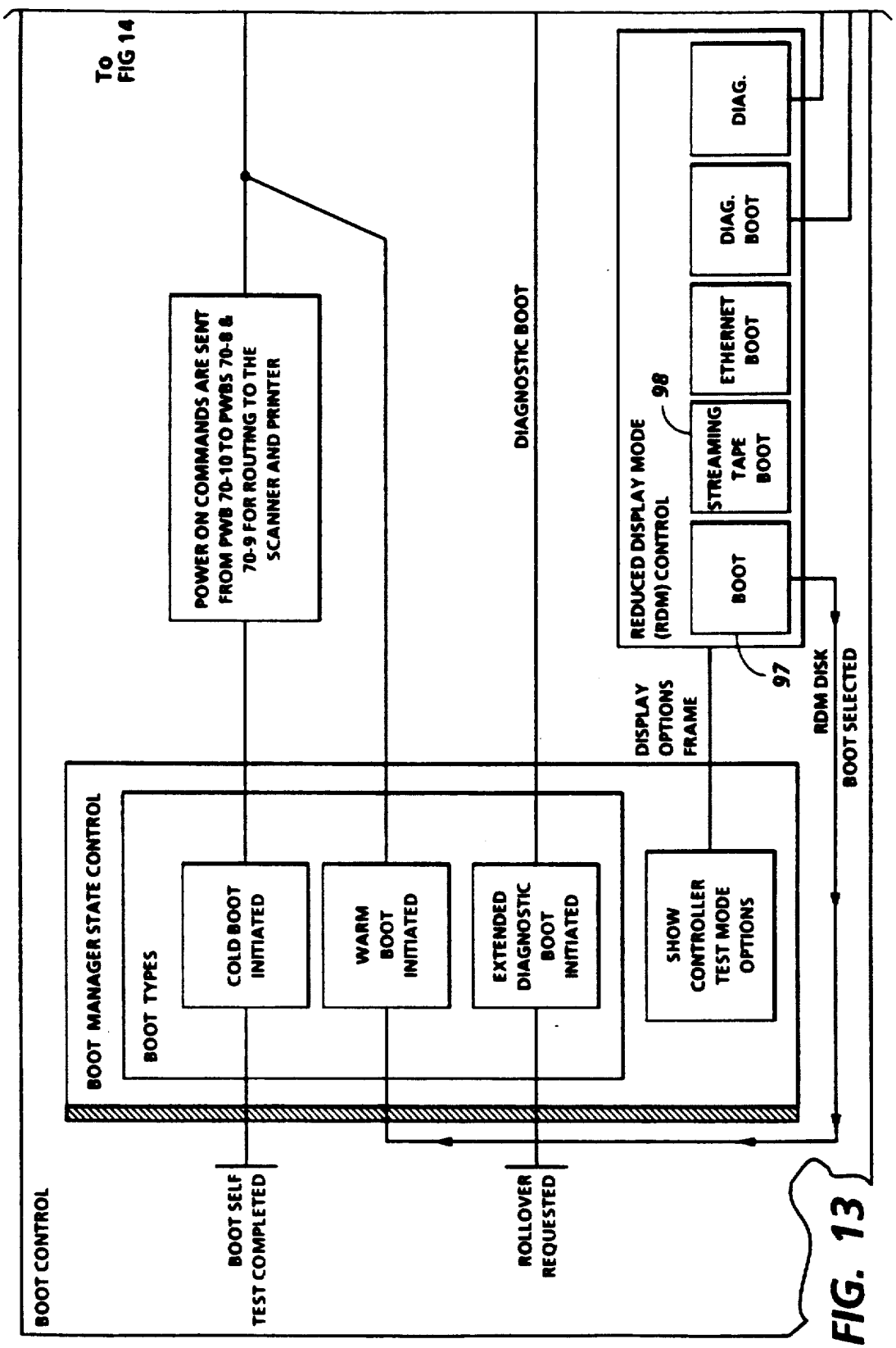
FIG. 13 is a block diagram depicting cold and warm boot implementations.
Figure 14:
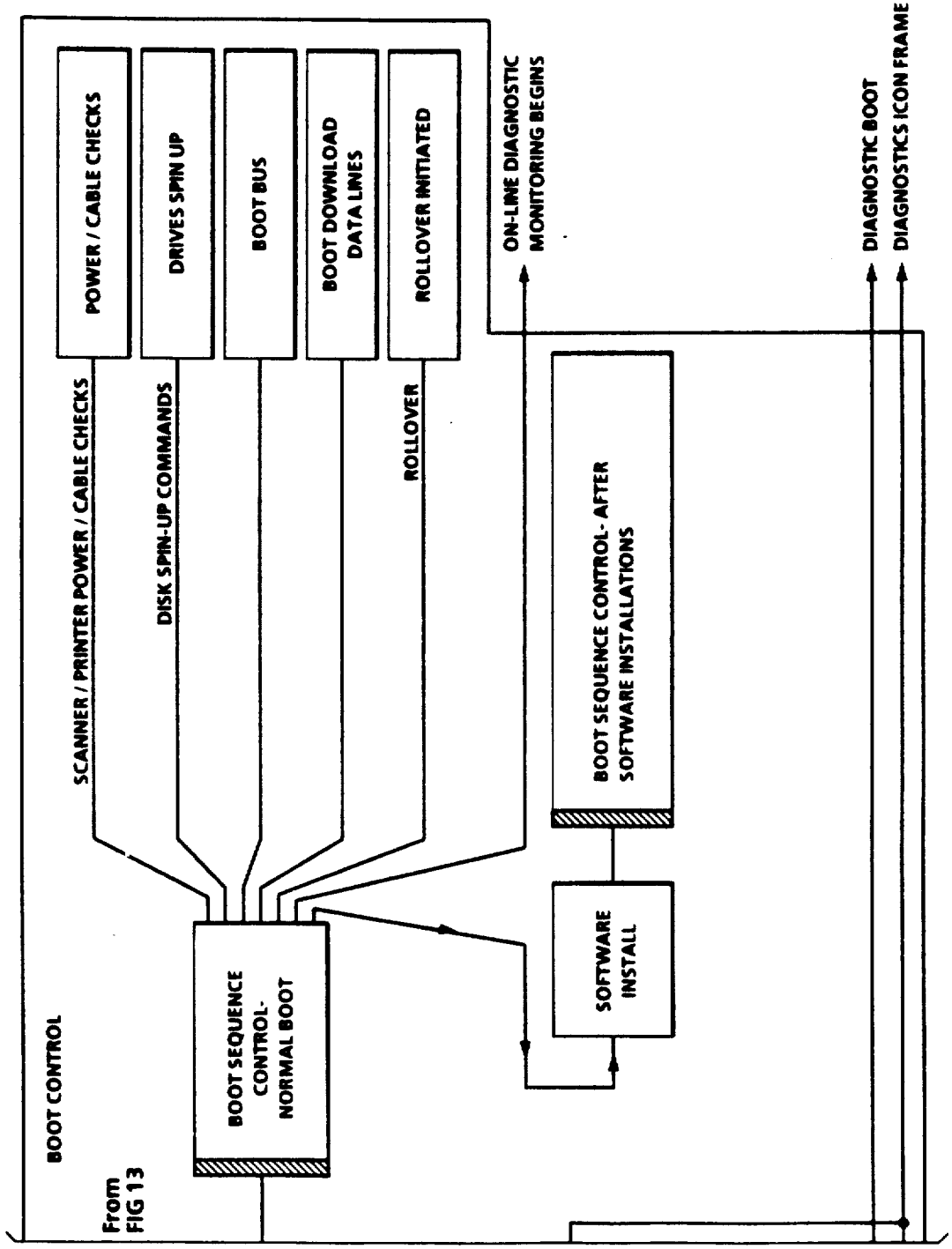
FIG. 14 is a block diagram depicting disk spin-up and software downloading processes during booting.
Figure 15:
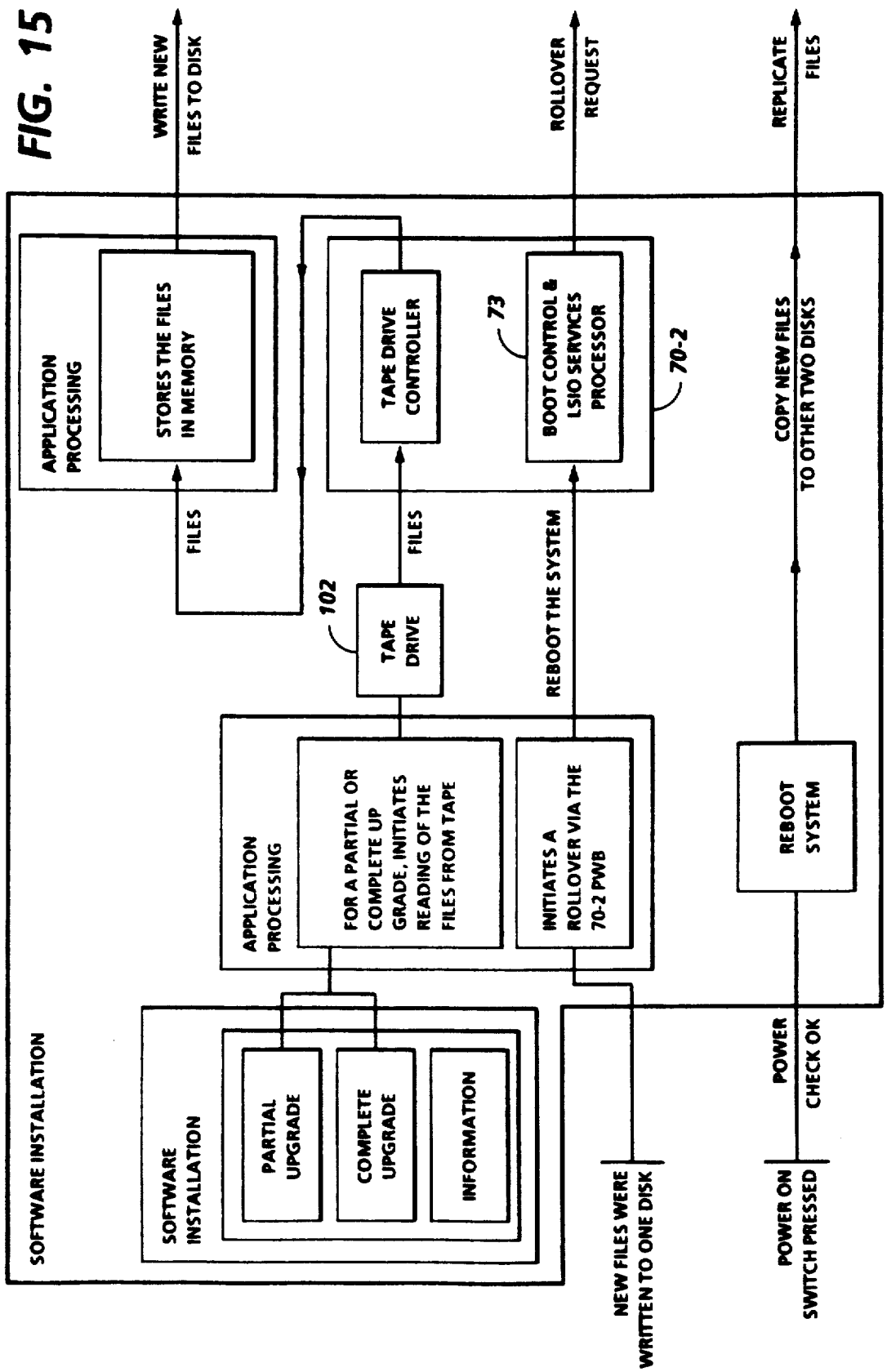
FIG. 15 is a block diagram depicting the process for installing new or upgraded software from streaming tape through the maintenance panel shown in FIG. 8.

As will be understood, it is necessary to boot the system when power is first switched on (Cold Boot initiated) or when necessary during system operation (Warm Boot initiated). For the later, a manual 'Boot' button 97 (seen in FIG. 13) is provided. For Cold Boot, the system processors 78, except for maintenance panel 95, are in a reset state. On power up, maintenance panel 95 (see "MP PWB" in FIG. 10) checks to determine if power input is correct, and if so, releases reset lines contained in a Boot Bus 92. As shown in FIGS. 9 and 11, boot Bus 92 is coupled to Boot & LSIO service processor 73 and UI communication controller 80 on PWB 70-2 through boot bus processor 75, and to channel Loader/Scheduler processor 76 on PWB 70-10 through boot bus processor 77 (FIG. 12). The reset lines release processors 76 and 73 and UI communication controller 80, allowing Boot Bus 92 during the boot sequence to transmit software programs from PWB 70-2 to processor 76 on PWB 70-10 for downloading to each processor channel 81. Once communications are established, Boot Channel 93 initializes all channels 81 to enable downloading of the micro code instructions by channel Loader/Scheduler processor 76 as described in TABLE I and shown in FIGS. 13, 14.

Whenever the system is booted, the PROC ID stored in chip 69 is read and compared with the PROC ID from the Sys NVM Seal and the Sys NVM Seal compared with the PV Boot Page Seal to determine if PWB 70-2 is defective or if any disk has been replaced. The PROC ID is compared with the PV Root Page Proc. ID to see if the booting disk was replaced.

When the boot file cannot be read off the specified boot disk, the disk number is incremented and the booting process continues using a second disk. If the second disk is found to be unavailable, booting from the third disk is tried. Where booting cannot be made from any disk following a preset number of tries, the system returns to a service dialogue routine in Diagnostic Manager 56, requiring servicing by the Tech Rep and booting of the system through the use of streaming tape using streaming tape boot button 98 (seen in FIG. 13).

Referring to FIGS. 6, 8, 15 and 16, from time to time the current system on disks 90-1, 90-2, 90-3 is upgraded with new software or partial software upgrades. The new or upgraded software is input to the boot disk (i.e., 90-2) using streaming tape contained in a stream tape cartridge 100. To do this, maintenance panel 95 has a suitable tape drive 102 into which cartridge 100 is inserted and autoloaded into the system. The software revision level is updated in the dedicated area, with files that are updated being marked inconsistent and the system shut off. On subsequent booting, inconsistent files are migrated to the other disks in the system, in this example, top and bottom disks 90-1, 90-3 if the system is booted up successfully with the new software on boot disk 90-2. If booting cannot be accomplished, a different disk is chosen as the boot disk, with booting accomplished using the old or pre-upgraded software. Following booting of the system using the old software, the old software is restored to the original boot disk 90-2 through reverse migration.

In the event that all of the disks 90-1, 90-2, 90-3 are unable to boot the system, streaming tape is used to boot the system via maintenance panel 95. For this, streaming tape boot button 98 (FIG. 13) is actuated.

While streaming tape has been described herein as the source of new or upgraded software as well as for use in booting the system in the event booting cannot be accomplished using one of the disks 90-1, 90-2, 90-3, other sources for software input and booting such as floppy disks may be envisioned.

While the invention has been described with reference to the structure disclosed, it is not confined to the details set forth, but is intended to cover such modifications or changes as may come within the scope of the following claims.

TABLE I

BOOT SEQUENCE CONTROL-NORMAL BOOT

1. POWER & CABLE CONNECTIONS ARE CHECKED BOTH TO SCANNER 4 & PRINTER 8
2. SYSTEM MEMORY 61 TESTED & INITIALIZED. CHANNEL PROCESSORS 81 PERFORM READS & WRITES TO VARIOUS SECTIONS OF MEMORY 61
3. DISK CONTROLLER MICROCODE IS DOWNLOADED TO DISK CONTROLLER PROCESSORS 82 VIA BOOT BUS 92 & BOOT DOWNLOAD CONTROL LOGIC 79
4. IF COLD BOOT, SPIN-UP COMMANDS SENT TO DISK DRIVES 83 (IF WARM BOOT, CHECKS MADE TO SEE IF ALL DISKS 90-1, 90-2, 90-3 ARE SPINNING)
5. CHANNEL LOADER MICROCODE IS SENT VIA BOOT BUS 92 TO PWB 70-10. MICROCODE IS THEN DOWNLOADED USING BOOT DOWNLOAD CONTROL LOGIC 79 TO CHANNEL LOADER/SCHEDULER PROCESSOR 76.
6. CHANNEL LOADER/SCHEDULER PROCESSOR 76 REQUESTS THAT DISK CONTROLLER PROCESSOR 82 RETRIEVE THE CONTROLLER MICROCODE FILE FROM DISK 90-2. DISK CONTROLLER PROCESSOR 82 SHIPS FILE TO MEMORY 61. CHANNEL LOADER/SCHEDULER PROCESSOR 76 THEN DOWNLOADS MICROCODE TO EACH CHANNEL 81 USING BOOT DOWNLOAD CONTROL LOGIC.
7. CHANNEL LOADER/SCHEDULER PROCESSOR 76 REQUESTS THAT DISK CONTROLLER PROCESSOR 83 RETRIEVE THE APPLICATION SOFTWARE LOADER PROGRAM FROM DISK 90-2. DISK CONTROLLER PROCESSOR 83 SHIPS FILE TO MEMORY 61.
8. SCHEDULER MICROCODE IS DOWNLOADED INTO CHANNEL LOADER/SCHEDULER PROCESSOR 76. PROCESSOR 76 WILL NOW PERFORM ONLY AS A SCHEDULER PROCESSOR.
9. APPLICATION SOFTWARE LOADER PROGRAM IS STARTED. APPLICATION SOFTWARE IS RETRIEVED FROM DISK 90-2 & STORED IN MEMORY 61.
10. UI 52, SCANNER 4, & PRINTER 8 SOFTWARE IS DOWNLOADED.

We claim:

1. A process for upgrading current system software with a new software release in a printing system having plural disks providing permanent memory for storing system software, a first of said disks serving as a boot disk on starting of said system, comprising the steps of:
    a) dedicating an area on each of said disks for storing the software revision level of the software on said disks;
    b) inputting said new software release to said system;
    c) upgrading a particular subset of software files on said boot disk from said new software;
    d) marking said particular subset of upgraded software files on said boot disk as inconsistent;
    e) updating said software revision level on said boot disk after completing the upgrading of said particular subset of software files, to identify that the software on said boot disk has been upgraded;
    f) terminating said software upgrading process, for said boot disk, when upgrading of said boot disk is completed;
    g) booting said system from said boot disk, when possible;
    h) upon successfully booting said system to an operating state, from said boot disk, automatically migrating the particular subset of software files, marked as inconsistent, from said boot disk to the remaining ones of said disks to upgrade the software on said remaining disks;

i) when booting is successful from said boot disk, updating said software revision level on said remaining disks at the conclusion of the migrating process, to identify that the particular subset of software files on said remaining disks has been upgraded;

j) where said system cannot be booted from said boot disk, booting said system from a second one of said plurality of disks;

k) restoring all software files on said boot disk back to the preupgraded software by writing the current software release from said second disk to said boot disk whereby to enable said system to be operated without interruption using said current software; and l) changing the revision level of the system software on said boot disk in response to returning said system software on said boot disk to the same system software level of said second disk.

2. A process for upgrading current system software with a new software release in a printing system having plural disks providing permanent memory for storing system software, a first of said disks serving as a boot disk on starting of said system, comprising the steps of:

a) starting said system;

b) inputting said new software release to said boot disk for use in upgrading said current system software;

c) dedicating an area on each of said disks for storing software identification data identifying the current software release level loaded in said system;

d) identifying a subset of software files in said new software release that are inconsistent with like files in said current system software;

e) writing the identified subset of software files from said new system software release to said boot disk over the like files in said current system software;

f) updating said software identification data on said boot disk to identify said upgraded software;

g) terminating said software upgrading process when all of said subset of software files on said boot disk has been upgraded; and h) stopping said system;

i) starting said system;

j) booting said system, when possible, from said boot disk;

k) upon successfully booting said system from said boot disk, automatically migrating said upgraded subset of software files from said boot disk to the remaining ones of said disks, when booting of said disk is possible from said boot disk, for upgrading the software on said other disks;

l) where said system cannot be booted from said boot disk, booting said system from a second one of said plurality of disks;

m) restoring all software files on said boot disk back to the preupgraded software by writing the current software release from said second disk to said boot disk whereby to enable said system to be operated without interruption using said current software; and n) changing the revision level of the system software on said boot disk in response to returning said system software on said boot disk to the same system software level on said second disk.

3. A process for upgrading system software in a printing system of the type having plural disks on which system software is stored, said printing system having first and second operating conditions, said system software including booting software for booting said system from said first operating condition to said second operating condition, comprising the steps of:

a) replicating system software on each of said disks;

b) storing the revision level of the current system software replicated on said disks;

c) selecting a first of said disks as a boot disk for booting said system to said operating state;

d) activating said system to said first operating condition;

e) upgrading a subset of said current system software on said first disk to provide upgraded system software on said first disk;

f) changing the revision level of the system software on said first disk after upgrading said subset of system software;

g) inactivating said system;

h) activating said system to said first operating condition;

i) booting said system to a second operating condition, when possible with said booting software on said first disk;

j) upon successfully booting said system from said first disk, migrating said upgraded subset of system software from said first disk to the remaining ones of said plurality of disks to upgrade said system software on said remaining disks;

k) changing the revision level of the system software on said remaining disks to identify said upgraded subset of system software on said remaining disks;

l) on failure to boot said system from said first disk, selecting a second one of said disks as the boot disk;

m) using said booting software on said second disk, booting said system to said second operating condition;

n) automatically migrating the system software from said second disk to said first disk to restore the system software on said first disk back to the system software level prior to upgrading; and o) changing the revision level of the system software on said first disk in response to returning said system software on said first disk to the same system software level on said second disk.

* * * * *